US006993342B2

(12) United States Patent  
Kuchibhotla et al.

(10) Patent No.: US 6,993,342 B2  
(45) Date of Patent: *Jan. 31, 2006

(54) BUFFER OCCUPANCY USED IN UPLINK SCHEDULING FOR A COMMUNICATION DEVICE

(75) Inventors: Ravi Kuchibhotla, Gurnee, IL (US); Robert T. Love, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/431,249

(22) Filed: May 7, 2003

(65) Prior Publication Data

US 2004/0224677 A1    Nov. 11, 2004

(51) Int. Cl.  
*H04Q 7/20* (2006.01)

(52) U.S. Cl. .................... 455/450; 455/436; 455/442; 370/329; 370/341; 370/331

(58) Field of Classification Search ............... 455/450, 455/436, 442, 458, 500, 509, 517, 69, 522; 370/329, 341, 331, 441  
See application file for complete search history.

(56) References Cited

U.S. PATENT DOCUMENTS

| | | | |
|---|---|---|---|
| 6,449,290 B1 * | 9/2002 | Willars et al. | 455/13.2 |
| 6,822,969 B2 * | 11/2004 | Love et al. | 370/444 |
| 2002/0154610 A1 * | 10/2002 | Tiedemann et al. | 370/329 |
| 2002/0175855 A1 * | 11/2002 | Richton et al. | 342/357.02 |
| 2002/0183066 A1 * | 12/2002 | Pankaj | 455/453 |
| 2003/0133457 A1 * | 7/2003 | Ono et al. | 370/395.4 |
| 2003/0152059 A1 * | 8/2003 | Odman | 370/338 |
| 2003/0161343 A1 * | 8/2003 | Ghosh | 370/465 |

OTHER PUBLICATIONS

"UL overhead reduction by using DL activity dependent CQI reporting" *3GPP TSG-RAN WGI#28*; Lucent Technologies, Aug. 2002.  
"Averaging of CQI measurements for mixed UE velocities." *3GPP TSG-RAN WG1#30*; Philips, Jan. 2003.  
"Improvement of HSDPA throughput and resource consumption using fast CQI messages." *3GPP TSG-RAN WG1#30*; Siemens, Jan. 2003.  
"CQI Reporting Enhancement." *3GPP TSG-RAN WG1#28*; Siemens, Aug. 2002.  
"Variable rate channel quality indication in HSDPA." *3GPP TSG-RAN WG1#22*; Lucent Technologies, Nov. 2001.  
"Variable Rate Channel Quality Indication." *3GPP TSG-RAN WG1#27*; Lucent, Jul. 2002.  
"Need for variable rate channel quality indication in HSDPA." *3GPP TSG-RAN WG1#24*; Lucent Technologies, Feb. 2002.

* cited by examiner

*Primary Examiner*—Erika A. Gary  
*Assistant Examiner*—Huy D. Nguyen  
(74) *Attorney, Agent, or Firm*—Roland K. Bowler, II; Brian M. Mancini (57) ABSTRACT

A method for using buffer occupancy in uplink scheduling for a communication device includes a first step of sending buffer occupancy information and a time stamp indicating a last transmission opportunity provided to the communication device to an active set base stations. A next step includes utilizing the buffer occupancy information and time stamp to adjust a scheduling fairness setting for the communication device. A next step includes receiving scheduling information from a scheduler in accordance with the scheduling fairness setting. A next step includes transmitting on an uplink channel in accordance with the scheduling information.

20 Claims, 8 Drawing Sheets

BUFFER OCCUPANCY USED IN UPLINK SCHEDULING FOR A COMMUNICATION DEVICE

FIELD OF THE INVENTION

The present invention relates generally to a wireless communication device, and more specifically to fairness in uplink scheduling of a communication device.

BACKGROUND OF THE INVENTION

In a Universal Mobile Telecommunications System (UMTS), such as that proposed for the next of the third generation partnership project (3GPP) standards for the UMTS Terrestrial Radio Access Network (UTRAN), such as wideband code division multiple access (WCDMA) or cdma2000 for example, user equipment (UE) such as a mobile station, (MS) communicates with any one or more of a plurality of base station subsystems (BSSs) dispersed in a geographic region. Typically, a BSS (known as Node-B in WCDMA) services a coverage area that is divided up into multiple sectors (known as cells in WCDMA). In turn, each sector is serviced by one or more of multiple base transceiver stations (BTSs) included in the BSS. The mobile station is typically a cellular communication device. Each BTS continuously transmits a downlink (pilot) signal. The MS monitors the pilots and measures the received energy of the pilot symbols.

In a cellular system, there are a number of states and channels for communications between the MS and the BSS. For example, in IS95, in the Mobile Station Control on the Traffic State, the BSS communicates with the MS over a Forward Traffic Channel in a forward link and the MS communicates with the BSS over a Reverse Traffic Channel in a reverse link. During a call, the MS must constantly monitor and maintain four sets of pilots. The four sets of pilots are collectively referred to as the Pilot Set and include an Active Set, a Candidate Set, a Neighbor Set, and a Remaining Set, where, although the terminology may differ, the same concepts generally apply to the WCDMA system.

The Active Set includes pilots associated with the Forward Traffic Channel assigned to the MS. This set is active in that the pilots and companion data symbols associated with this set are all actively combined and demodulated by the MS. The Candidate Set includes pilots that are not currently in the Active Set but have been received by the MS with sufficient strength to indicate that an associated Forward Traffic Channel could be successfully demodulated. The Neighbor Set includes pilots that are not currently in the Active Set or Candidate Set but are likely candidates for handoff. The Remaining Set includes all possible pilots in the current system on the current frequency assignment, excluding the pilots in the Neighbor Set, the Candidate Set, and the Active Set.

When the MS is serviced by a first BTS, the MS constantly searches pilot channels of neighboring BTSs for a pilot that is sufficiently stronger than a threshold value. The MS signals this event to the first, serving BTS using a Pilot Strength Measurement Message. As the MS moves from a first sector serviced by a first BTS to a second sector serviced by a second BTS, the communication system promotes certain pilots from the Candidate Set to the Active Set and from the Neighbor Set to the Candidate Set. The serving BTS notifies the MS of the promotions via a Handoff Direction Message. Afterwards, for the MS to commence communication with a new BTS that has been added to the Active Set before terminating communications with an old BTS, a "soft handoff" will occur.

For the reverse link, typically each BTS in the Active Set independently demodulates and decodes each frame or packet received from the MS. It is then up to a switching center or selection distribution unit (SDU) normally located in a Base Station Site Controller (BSC), which is also known as a Radio Network Controller (RNC) using WCDMA terminology, to arbitrate between the each BTS's decoded frames. Such soft handoff operation has multiple advantages. Qualitatively, this feature improves and renders more reliable handoff between BTSs as a user moves from one sector to the adjacent one. Quantitatively soft-handoff improves the capacity/coverage in a WCDMA system. However, with the increasing amount of demand for data transfer (bandwidth), problems can arise.

Several third generation standards have emerged, which attempt to accommodate the anticipated demands for increasing data rates. At least some of these standards support synchronous communications between the system elements, while at least some of the other standards support asynchronous communications. At least one example of a standard that supports synchronous communications includes cdma2000. At least one example of a standard that supports asynchronous communications includes WCDMA.

While systems supporting synchronous communications can sometimes allow for reduced search times for handover searching and improved availability and reduced time for position location calculations, systems supporting synchronous communications generally require that the base stations be time synchronized. One such common method employed for synchronizing base stations includes the use of global positioning system (GPS) receivers, which are co-located with the base stations that rely upon line of sight transmissions between the base station and one or more satellites located in orbit around the earth. However, because line of sight transmissions are not always possible for base stations that might be located within buildings or tunnels, or base stations that may be located under the ground, sometimes the time synchronization of the base stations is not always readily accommodated.

However, asynchronous transmissions are not without their own set of concerns. For example, the timing of uplink transmissions in an environment supporting MS autonomous scheduling (whereby a MS may transmit whenever the MS has data in its transmit buffer and all MSs are-allowed to transmit as needed) by the individual MSs can be quite sporadic and/or random in nature. While traffic volume is low, the autonomous scheduling of uplink transmissions is less of a concern, because the likelihood of a collision (i.e. overlap) of data being simultaneously transmitted by multiple MSs is also low. Furthermore, in the event of a collision, there is spare bandwidth available to accommodate the need for any retransmissions. However, as traffic volume increases, the likelihood of data collisions (overlap) also increases. The need for any retransmissions also correspondingly increases, and the availability of spare bandwidth to support the increased amount of retransmissions correspondingly diminishes. Consequently, the introduction of explicit scheduling (whereby a MS is directed by the network when to transmit) by a scheduling controller can be beneficial.

However even with explicit scheduling, given the disparity of start and stop times of asynchronous communications and more particularly the disparity in start and stop times relative to the start and stop times of different uplink transmission segments for each of the non-synchronized base stations, gaps and overlaps can still occur. Both gaps and overlaps represent inefficiencies in the management of radio resources (such as rise over thermal (RoT), a classic and well-known measure of reverse link traffic loading in CDMA systems), which if managed more precisely can lead to more efficient usage of the available radio resources and a reduction in the rise over thermal (RoT).

Figure 1:
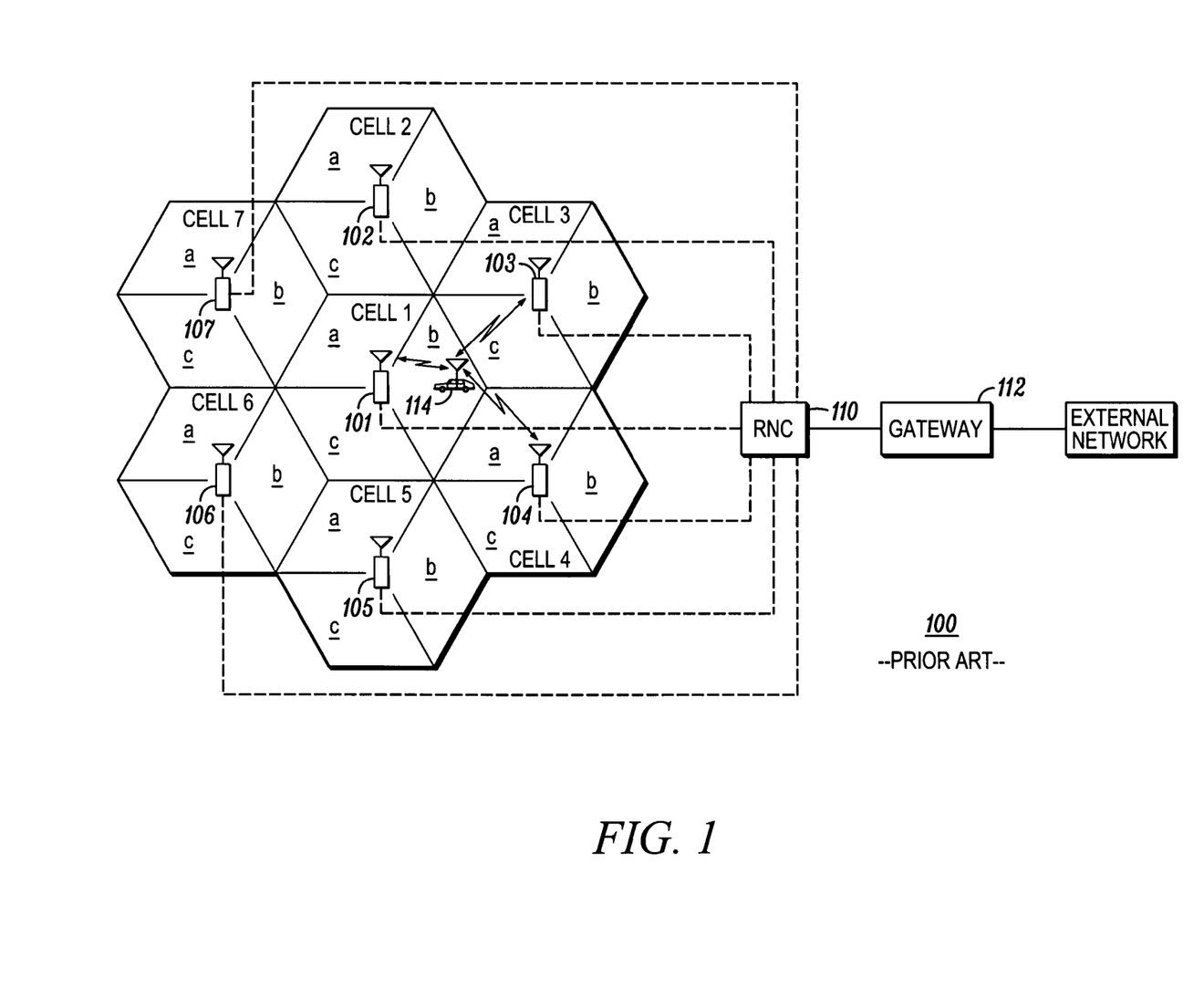
FIG. 1 is a block diagram of an exemplary communication system of the prior art.

For example, FIG. 1 is a block diagram of communication system 100 of the prior art. Communication system 100 can be a cdma2000 or a WCDMA system. Communication system 100 includes multiple cells (seven shown), wherein each cell is divided into three sectors (a, b, and c). A BSS 101–107 located in each cell provides communications service to each mobile station located in that cell. Each BSS 101–107 includes multiple BTSs, which BTSs wirelessly interface with the mobile stations located in the sectors of the cell serviced by the BSS. Communication system 100 further includes a radio network controller (RNC) 110 coupled to each BSS and a gateway 112 coupled to the RNC. Gateway 112 provides an interface for communication system 100 with an external network such as a Public Switched Telephone Network (PSTN) or the Internet.

The quality of a communication link between an MS, such as MS 114, and the BSS servicing the MS, such as BSS 101, typically varies over time and movement by the MS. As a result, as the communication link between MS 114 and BSS 101 degrades, communication system 100 provides a soft handoff (SHO) procedure by which MS 114 can be handed off from a first communication link whose quality has degraded to another, higher quality communication link. For example, as depicted in FIG. 1, MS 114, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-*b*, 3-*c*, and 4-*a*, are known in the art as the Active Set of the MS.

Figure 2:
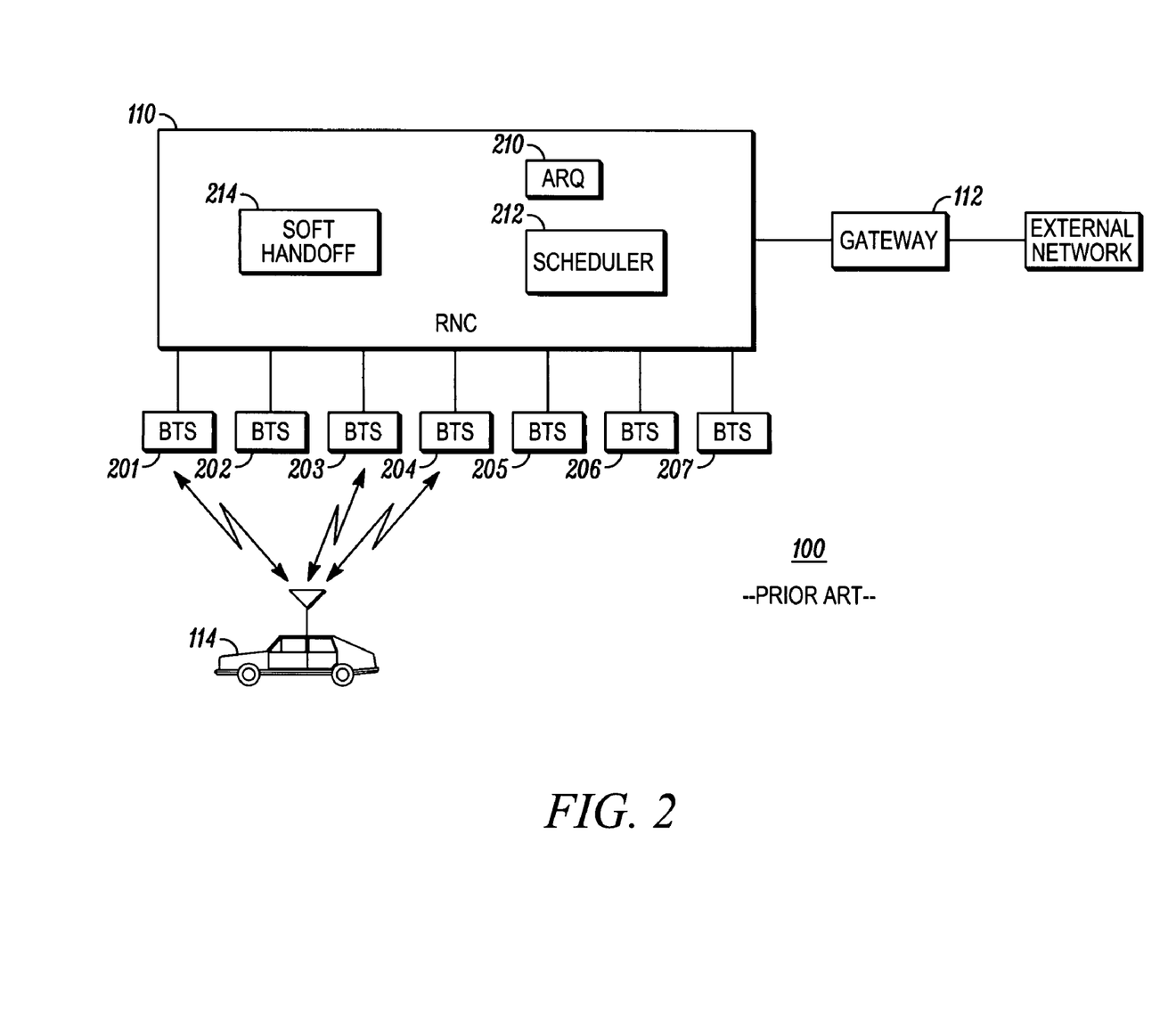
FIG. 2 is a block diagram of a hierarchical structure of the communication system of FIG. 1.

Referring now to FIG. 2, a soft handoff procedure performed by communication system 100 is illustrated. FIG. 2 is a block diagram of a hierarchical structure of communication system 100. As depicted in FIG. 2, RNC 110 includes an ARQ function 210, a scheduler 212, and a soft handoff (SHO) function 214. FIG. 2 further depicts multiple BTSs 201–207, wherein each BTS provides a wireless interface between a corresponding BSS 101–107 and the MSs located in a sector serviced by the BSS.

When performing a soft handoff, each BTS 201, 203, 204 in the Active Set of the MS 114 receives a transmission from MS 114 over a reverse link of a respective communication channel 221, 223, 224. The Active Set BTSs 201, 203, and 204 are determined by SHO function 214. Upon receiving the transmission from MS 114, each Active Set BTS 201, 203, 204 demodulates and decodes the contents of a received radio frame.

At this point, each Active Set BTS 201, 203, 204 then conveys the demodulated and decoded radio frame to RNC 110, along with related frame quality information. RNC 110 receives the demodulated and decoded radio frames along with related frame quality information from each BTS 201, 203, 204 in the Active Set and selects a best frame based on frame quality information. Scheduler 212 and ARQ function 210 of RNC 110 then generate control channel information that is distributed as identical pre-formatted radio frames to each BTS 201, 203, 204 in the Active Set. The Active Set BTSs 201, 203, 204 then simulcast the pre-formatted radio frames over the forward link.

Alternatively, the BTS of the current cell where the MS is camped (BTS 202) can include its own scheduler and bypass the RNC 110 when providing scheduling information to the MS. In this way, scheduling functions are distributed by allowing a mobile station (MS) to signal control information corresponding to an enhanced reverse link transmission to Active Set base transceiver stations (BTSs) and by allowing the BTSs to perform control functions that were previously supported by a RNC. The MS in a SHO region can choose a scheduling assignment corresponding to a best Transport Format and Resource Indicator information (TFRI) out of multiple scheduling assignments that the MS receives from multiple Active Set BTS. As a result, the enhanced uplink channel can be scheduled during SHO, without any explicit communication between the BTSs. In either case, explicit transmit power constraints (which are implicit data rate constraints) are provided by a scheduler, which are used by the MS 114, along with control channel information, to determine what transmission rate to use. MS buffer occupancy is also a parameter that is considered in determining a transmission rate.

As proposed for the UMTS system, a MS can use an enhanced uplink dedicated transport channel (EUDCH) to achieve an increased uplink data rate. The MS must determine the data rate to use for the enhanced uplink based on local measurements at the MS, such as buffer occupancy for example, and information provided by the scheduler.

In practice, when an MS is explicitly scheduled (Explicit Mode) by the BTS, for example, to use the enhanced uplink channel, or when a MS autonomously decides when to transmit data (Autonomous mode), the MS must determine a transmission rate given the constraints of a maximum rate or equivalently a maximum power margin indicated by the scheduler and the amount of data in its buffer. This is particularly important when the MS is in a multi-coverage area served by multiple cells where, in a CDMA system, such a MS is typically in soft handoff (SHO) with any of the said multiple cells if more than one are members of the MS's current Active Set.

The scheduling assignment is based on scheduling information that is sent by the mobile including buffer occupancy (BO), which is the amount of data in buffer that is to be transmitted in the uplink. In order to take advantage of diversity it is preferable to operate the enhanced uplink in SHO. When in SHO, the MS may get a scheduling assignment message from a BTS, and may successfully transmit data to this scheduling BTS. The other members of the active set may or may not be aware of this transaction depending on the relative strength of the uplink legs. This however potentially leads to several issues. Firstly, a non-scheduling BTS may schedule the MS based on outdated buffer occupancy reports received prior to the last successful scheduling of the MS. In addition, due to multiple schedulers that do not communicate with each other, the fairness of the overall system in scheduling users on the uplink may not be achieved. Further, the system will be skewed towards MSs reporting high BO with the potential for multiple BTSs scheduling the MS, resulting in a very unfair overall uplink throughput and there may also possibly be many wasted scheduling opportunities due to scheduling collisions between members of this MS's active set.

One solution is to have the MS include the BO in the TFRI sent on the uplink when scheduled. Since the TFRI is CRC protected this is a reliable mechanism for updating the BTSs. The TFRI includes information required by the BTS to decode the data channel and is sent in a separate message on an UL control channel, with the data sent on the enhanced uplink dedicated channel shortly following the control channel. However, it may be required that the TFRI be sent at a high enough power to ensure successful receipt at all active set Node Bs. This is a brute force approach especially in the presence of uplink imbalance in which case the other BTSs may not be using the BO report in any case due to the bad radio conditions and therefore unfavorable scheduling environment. Further, the BTS needs to be aware of the success of the data transmission linked to this TFRI message for the update to be successful, i.e. it needs to know if the data sent was successfully received. This is a problem since it is possible that the BTS receives the TFRI successfully but not the data. In this case, the BTS cannot reliably determine whether the MS was successful in the transmission or not depending on whether other BTSs in the active set received the data correctly or not in case it did not.

Another solution is to have more frequent BO reports. The frequency of the BO reporting can be increased to ensure that all the BTSs in the active set receive the latest BO status. However, this is not useful since it increases the uplink control messaging and reduces battery life and increases processing at the BTS. Another solution is to restrict non-scheduling BTSs from scheduling the MS until it receives the BO report again. This technique is rather limiting and can negatively impact system throughput in that the BTSs cannot take advantage of good radio conditions to schedule the MA. Further, due to the rapidly changing radio conditions, updates will have to be sent frequently on the MS to enable the BTSs to respond to radio conditions and MS movements. In addition, a BTS would need to schedule a MS immediately after the report is received to be sure that the BO report is meaningful.

Another solution is to include the BO in the data channel as part of the header. This avoids the problem described in the first solution described above. However, in this case only the successfully receiving BTS would be aware of the latest buffer occupancy. It does however help in avoiding the TFRI channel from being burdened with information that is not needed for the successful decoding of the data linked to the TFRI message. In addition, the receiving BTS could in principle determine the buffer status through combination of the traffic volume successfully received and the last BO report. However, this solution does not account for the change in buffer occupancy due to new data being generated at the transmitter. Even in this case by definition, the non-receiving BTSs in the active set do not have the latest BO report from the MS. A variant of the information in the header could be the sending of the rate of increase of BO as opposed to the actual BO. Or another variant is mobile could send the BO and include one bit as a rate indicator. However, this does lower data throughput.

Therefore, a need exists for a new technique to ensure that BTSs receive reliable buffer occupancy information. In particular, it would be of benefit to set up a technique to provide timely BO information to the active set BTSs such that a macro selection diversity benefit is obtained.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

The present invention provides novel techniques to ensure that BTSs receive reliable buffer occupancy information, such that a macro selection diversity benefit is obtained. In one aspect of the present invention, time-stamping of the last transmission opportunity along with buffer occupancy is reported so that BTSs have the latest information that can assist it in ensuring a higher degree of fairness. Another aspect of the present invention provides the last known transmission opportunity to the BTS when first added to the active set of the mobile, since it is likely that this BTS may schedule the mobile early on, to help it initialize its fairness setting. Another aspect of the present invention transmits a buffer occupancy report when the mobile determines that a BTS has exceed a certain predetermined uplink channel quality and is therefore most likely to schedule the mobile. Additional information such as persistence of fading, speed, distance from BTS, etc., could be sent or, alternatively, the threshold level could be based on persistence of fading, speed, etc. Another aspect of the present invention indicates the rate of buffer increase to help differentiate applications and make appropriate scheduling decisions and assisting with flow control at the mobile.

The indication of the last transmission opportunity by the mobile assists the non-scheduling and non-receiving BTSs to improve the fairness of scheduling. In addition, new BTSs added to the active set are instantly made aware of the transmission opportunities since they are most likely to schedule depending on the algorithm used to add BTSs in SHO and need to have their fairness initialized with the new mobile being served. Moreover, the unsolicited scheduling information is a very rapid trigger to the BTSs that assist in not only ensuring fairness but also ensuring that the latest information is at the BTSs so that a scheduling BTS can choose the most optimal assignment parameters (number of subframes, coding, etc.) if the mobile is scheduled. Further, by the use of different thresholds, information related to most current speed, fading environment can also be made available.

Providing the rate of increase of buffer occupancy, instead of or in addition to just the buffer occupancy, further helps the scheduler in differentiating different applications (identities of which are not visible to the BTS) and provides preferential treatment for users with higher rate of increase of buffer occupancy. This also helps with flow control at the mobile, a substantive issue as application data rates keep rising.

It is also envisioned that the present invention is applicable in the downlink for HSDPA. In this instance, the mobile triggers a CQI (Channel quality indicator) report on the uplink any time it detects that a downlink leg exceeds some quality target and that therefore the BTS is most likely to transmit. This new technique would ensure that the BTS has the latest information on the mobile's radio environment and could therefore be better able to make a good decision in terms of scheduling, modulation, etc. If and when mechanisms are added to the standards for enabling diversity benefits on the HS-DSCH (for HSDPA) this technique could also then assist in ensuring fairness similar to the uplink enhanced channel described above.

The invention described here provides both timely information to help maximize system throughput and ensures fairness, thereby improving uplink capacity and throughput performance. Most known techniques only relates to the improvement of the HSDPA performance. In one known technique, the BTS requests the MS to send the latest CQI information prior to the transmission of the first packet of a packet call. However, note that this is a circular approach since the BTS needs to first determine which mobiles to ask for this information, but this itself requires knowledge of the current channel quality of the mobile or else the BTS will need to rely on older and therefore potentially incorrect priority list outputs. In another known technique activity based feedback is provided that relates to the mobile sending CQI information along with every ACK/NACK information. The rationale in this technique being that any downlink activity is indication of more downlink activity especially in the case of a NACK being transmitted. However this does not ensure fairness. The present invention solves these problems in a novel way, as will be explained below.

The present invention may be more fully described with reference to FIGS. 3–5. FIG. 5 is a block diagram of a communication system 1000 in accordance with an embodiment of the present invention. Preferably, communication system 1000 is a Code Division Multiple Access (CDMA) communication system, such as cdma2000 or Wideband CDMA (WCDMA) communication system, that includes multiple communication channels. Those who are of ordinary skill in the art realize that communication system 1000 may operate in accordance with any one of a variety of wireless communication systems, such as a Global System for Mobile communication (GSM) communication system, a Time Division Multiple Access (TDMA) communication system, a Frequency Division Multiple Access (FDMA) communication system, or an Orthogonal Frequency Division Multiple Access (OFDM) communication system.

Similar to communication system 100, communication system 1000 includes multiple cells (seven shown). Each cell is divided into multiple sectors (three shown for each cell—sectors a, b, and c). A base station subsystem (BSS) 1001–1007 located in each cell provides communications service to each mobile station located in that cell. Each BSS 1001–1007 includes multiple base stations, also referred to herein as base transceiver stations (BTSs) or Node-Bs, which wirelessly interface with the mobile stations located in the sectors of the cell serviced by the BSS. Communication system 1000 further includes a radio network controller (RNC) 1010 coupled to each BSS, preferably through a 3GPP TSG UTRAN Iub Interface, and a gateway 1012 coupled to the RNC. Gateway 1012 provides an interface for communication system 1000 with an external network such as a Public Switched Telephone Network (PSTN) or the Internet.

Figure 3:
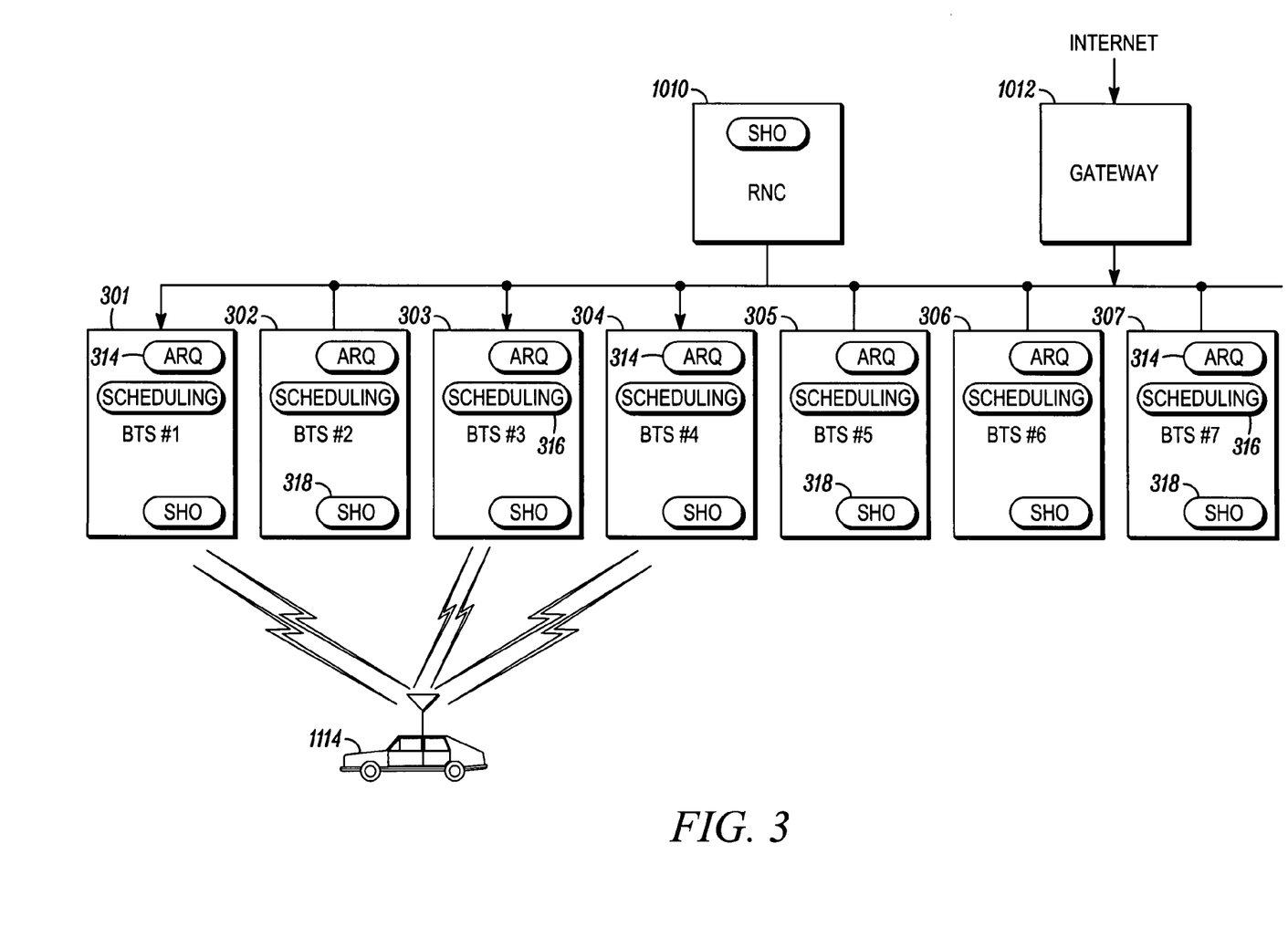
FIG. 3 depicts a distributed network architecture in accordance with an embodiment of the present invention.

Referring now to FIGS. 3 and 5, communication system 1000 further includes at least one mobile station (MS) 1014. MS 1014 may be any type of wireless user equipment (UE), such as a cellular telephone, a portable telephone, a radiotelephone, or a wireless modem associated with data terminal equipment (DTE) such as a personal computer (PC) or a laptop computer. MS 1014 is serviced by multiple BTSs that are included in an Active Set associated with the MS. MS 1014 wirelessly communicates with each BTS in communication system 1000 via an air interface that includes a forward link (from the BTS to the MS) and a reverse link (from the MS to the BTS). Each forward link includes multiple forward link control channels, a paging channel, and traffic channel. Each reverse link includes multiple reverse link control channels, a paging channel, and a traffic channel. However, unlike communication system 100 of the prior art, each reverse link of communication system 1000 further includes another traffic channel, an Enhanced Uplink Dedicated Transport Channel (EUDCH), that facilitates high speed data transport by permitting a transmission of data that can be dynamically modulated and coded, and demodulated and decoded, on a sub-frame by sub-frame basis.

FIG. 3 depicts a network architecture 300 of communication system 1000 in accordance with an embodiment of the present invention. As depicted in FIG. 3, communication system includes multiple BTSs 301–307, wherein each BTS provides a wireless interface between a corresponding BSS 1001–1007 and the MSs located in a sector serviced by the BTS. Preferably, a scheduling function 316, an ARQ function 314 and a SHO function 318 are distributed in each of the BTSs 301–307. RNC 1010 is responsible for managing mobility by defining the members of the Active Set of each MS serviced by communication system 1000, such as MS 1014, and for coordinating multicast/multireceive groups. For each MS in communication system 1000, Internet Protocol (IP) packets are multi-cast directly to each BTS in the Active Set of the MS, that is, to BTSs 301, 303, 304 in the Active Set of MS 1014.

Preferably, each BTS 301–307 of communication system 1000 includes a SHO function 318 that performs at least a portion of the SHO functions. For example, SHO function 318 of each BTS 301, 303, 304 in the Active Set of the MS 1014 performs SHO functions such as frame selection and signaling of a new data indicator. Each BTS 301–307 can include a scheduler, or scheduling function, 316 that alternatively can reside in the RNC 110. With BTS scheduling, each Active Set BTS, such as BTSs 301, 303, and 304 with respect to MS 1014, can choose to schedule the associated MS 1014 without need for communication to other Active Set BTSs based on scheduling information signaled by the MS to the BTS and local interference and SNR information measured at the BTS. By distributing scheduling functions 306 to the BTSs 301–307, there is no need for Active Set handoffs of a EUDCH in communication system 1000. The ARQ function 314 and AMC function, which functionality also resides in RNC 110 of communication system 100, can also be distributed in BTSs 301–307 in communication system 1000. As a result, when a data block transmitted on a specific Hybrid ARQ channel has successfully been decoded by an Active Set BTS, the BTS acknowledges the successful decoding by conveying an ACK to the source MS (e.g. MS 1014) without waiting to be instructed to send the ACK by the RNC 1010.

In order to allow each Active Set BTS 301, 303, 304 to decode each EUDCH frame, MS 1014 conveys to each Active Set BTS, in association with the EUDCH frame, modulation and coding information, incremental redundancy version information, HARQ status information, and transport block size information from MS 1014, which information is collectively referred to as transport format and resource-related information (TFRI). The TFRI defines rate and modulation coding information and H-ARQ status.

The MS 1014 codes the TFRI and sends the TFRI over the same frame interval as the EUDCH.

By providing MS 1014 signaling of the TFRI corresponding to each enhanced reverse link transmission to the Active Set BTSs 301, 303, 304, the communication system 1000 can support HARQ, AMC, Active Set handoff, and scheduling functions in a distributed fashion. As described in greater detail below, the communication system 1000 allows Active Set BTSs 301, 303, 304 to provide an efficient control channel structure to support scheduling, HARQ, AMC functions for an enhanced reverse link, or uplink, channel in order to maximize throughput, and enables an MS in a SHO region to choose a scheduling assignment corresponding to the best TFRI out of multiple assignments it receives from multiple Active Set BTS.

Figures 4, 4A:
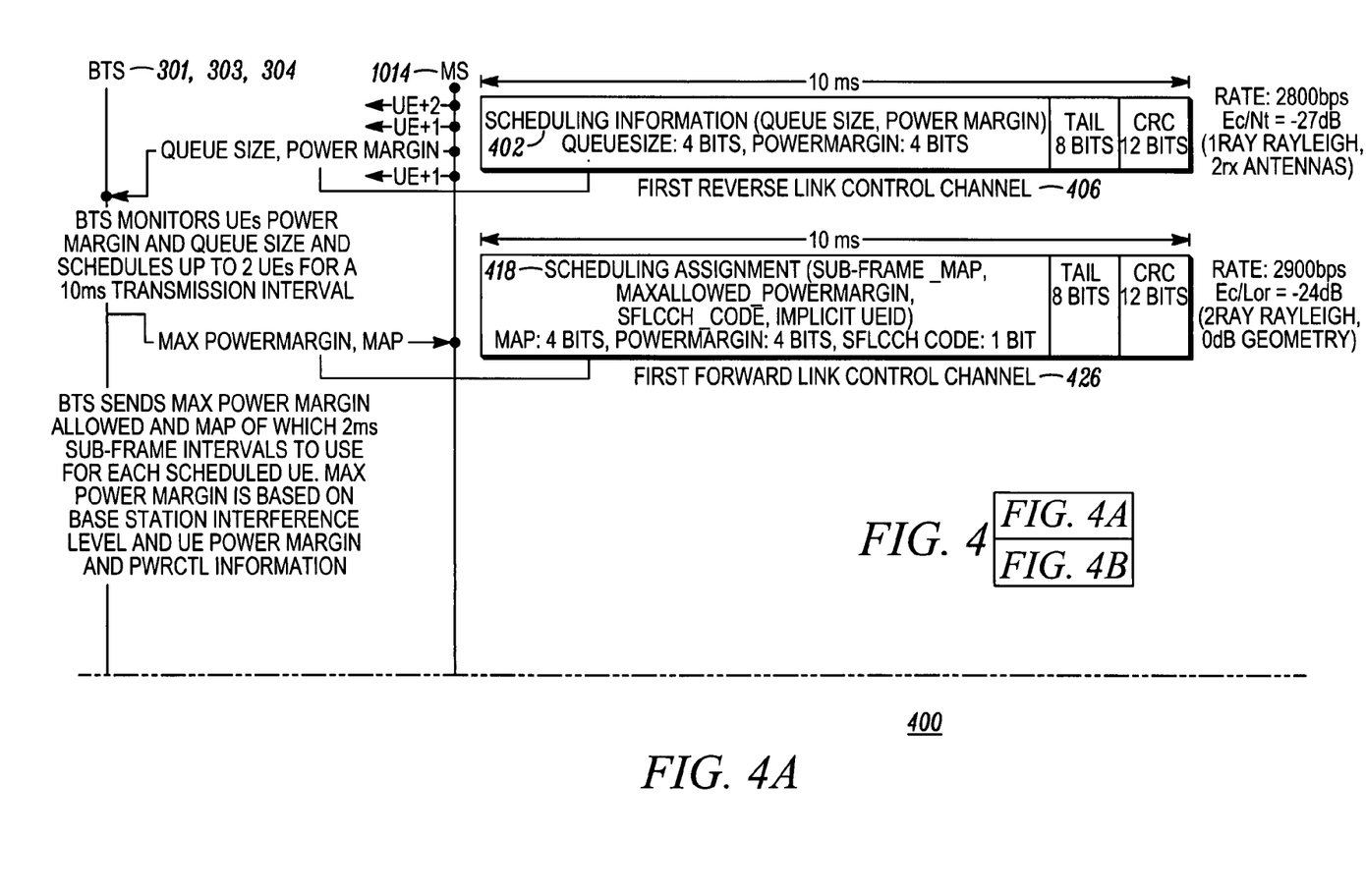
FIG. 4 is a message flow diagram in accordance with an embodiment of the present invention.
Figure 4B:
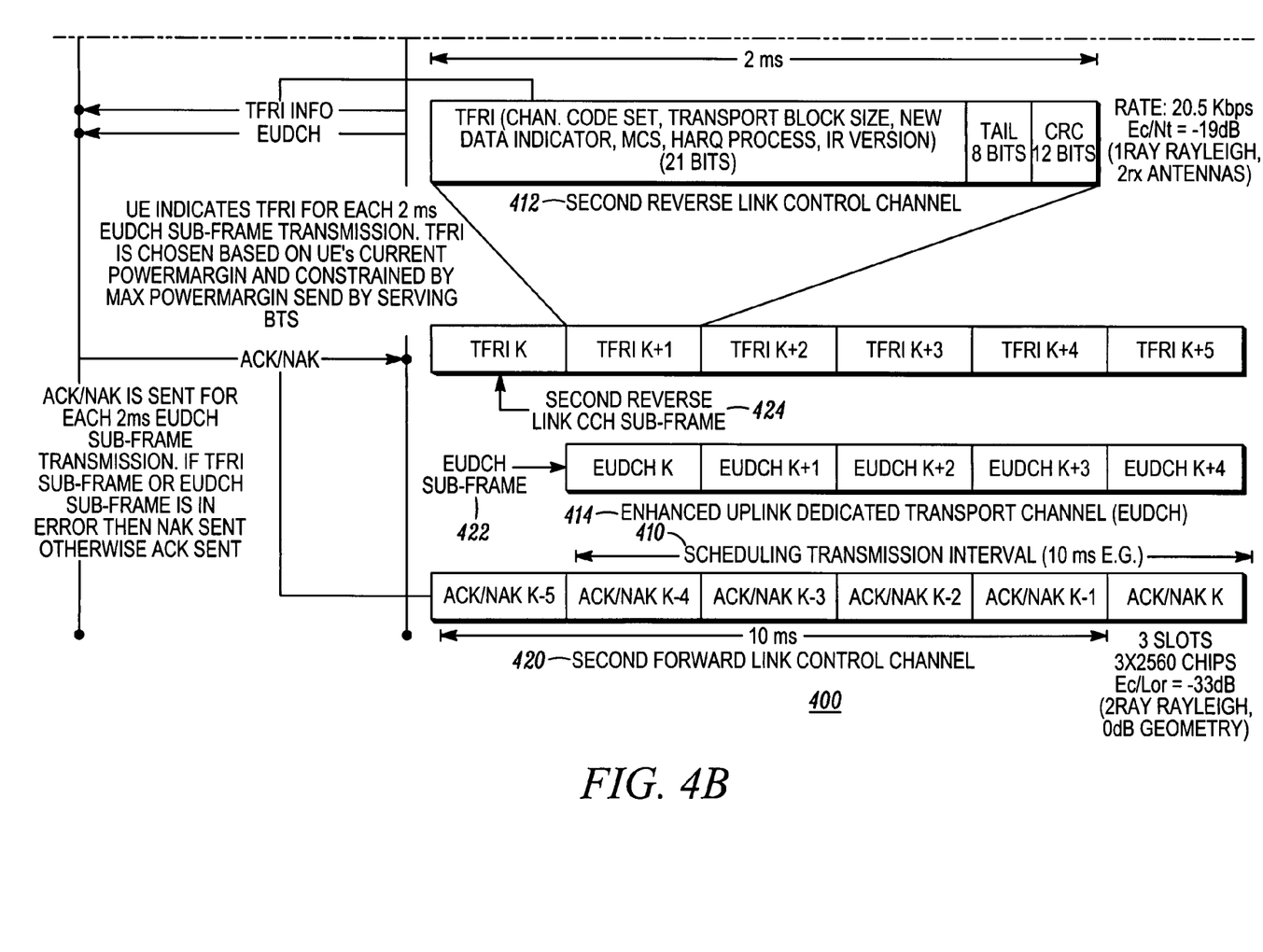
Figure 5:
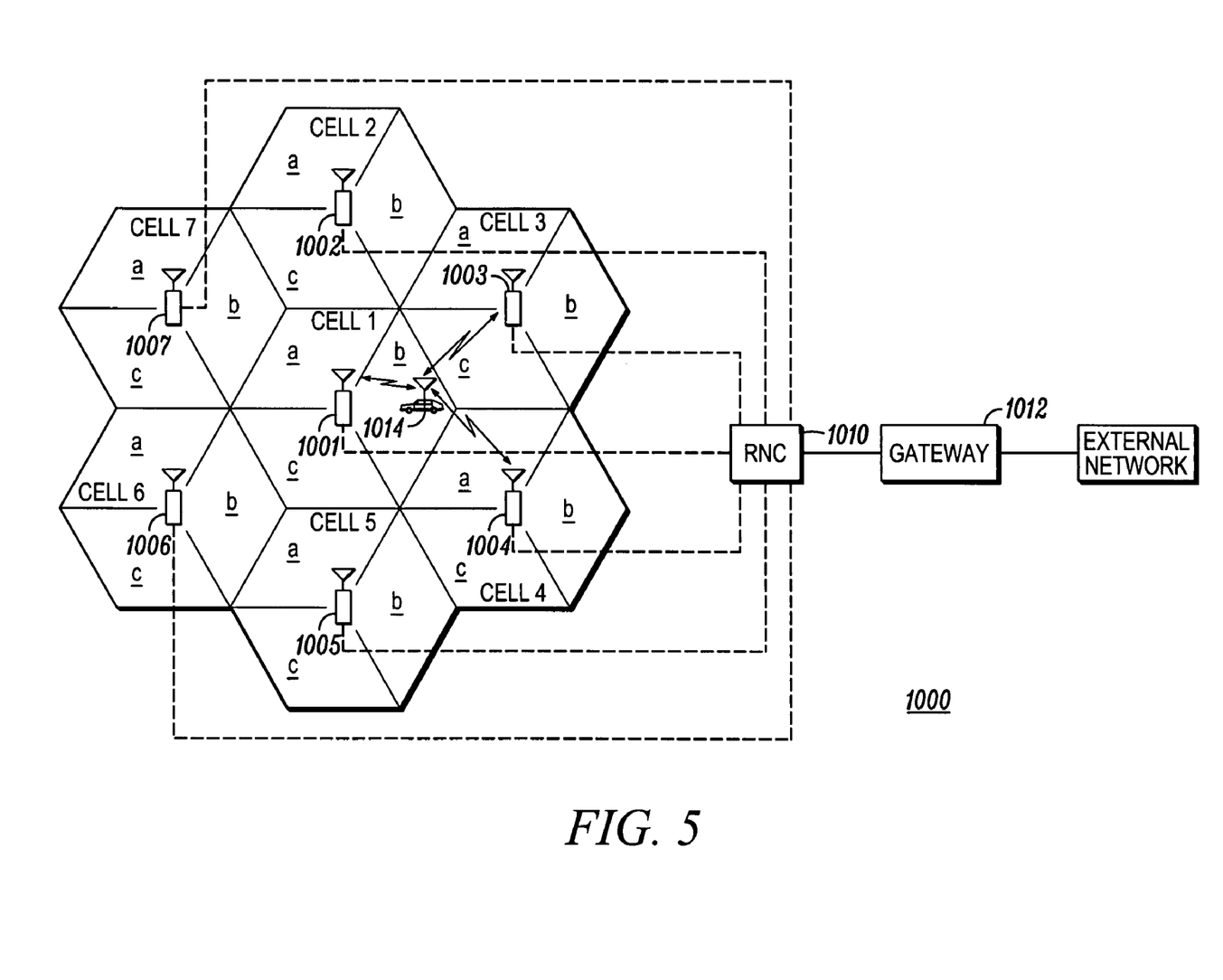
FIG. 5 is a block diagram of an exemplary communication system, in accordance with the present invention.

In operation, FIG. 4 shows a message flow diagram 400 illustrates an exchange of communications between an MS of communication system 1000, such as MS 1014, and each of the multiple BTSs included in an Active Set of the MS, that is, BTSs 301, 303, and 304. MS 1014 communicates scheduling information 402 to each Active Set BTS 301, 303, 304 using a first reverse link control channel 406 with a known fixed modulation and coding rate and transport block size. A corresponding code assignment for the first reverse link control channel is done on a semi-static basis. Preferably, MS 1014 does not transmit control information when the MS's corresponding data queue is empty.

Each Active Set BTS 301, 303, 304 receives scheduling information 402 from the MS 1014 serviced by the BTS via the first reverse link control channel 406. The scheduling information 402 may include the data queue status and the power status of the MS. Based on the scheduling information 402 received from each MS serviced by a BTS, each serving, or Active Set, BTS 301, 303, 304 schedules one or more of the MSs serviced by the BTS, that is, MS 1014, for each scheduling transmission interval 410.

Each Active Set BTS 301, 303, 304 uses reverse link interference level, MS scheduling information 402, and power control information to determine a maximum allowed power margin target or limit for each MS 1014 serviced by the BTS. Power margin is the difference between a current DPCCH power level and the maximum power level supported by the MS. The pilot is a reverse link channel that is used for demodulation purposes such as automatic frequency control, synchronization, and power control. For example, in a WCDMA system this channel is referred to as a DPCCH. A maximum EUDCH to DPCCH power ratio target can also be determined.

Upon choosing an MS (e.g. MS 1014) to be scheduled, each Active Set BTS 301, 303, 304 conveys a scheduling assignment 418 to the chosen MS, such as MS 1014, on a first forward link control channel 426. The scheduling assignment 418 consists of the maximum allowed 'power margin' limit or target and a map of the allowed EUDCH sub-frame transmission intervals, such as a 2 ms sub-frame interval, for the next 10 ms transmission interval using a first forward link control channel 426.

Referring to FIG. 5, communication system 1000 includes a soft handoff (SHO) procedure by which MS 1014 can be handed off from a first air interface whose quality has degraded to another, higher quality air interface. For example, as depicted in FIG. 5, MS 1014, which is serviced by a BTS servicing sector b of cell 1, is in a 3-way soft handoff with sector c of cell 3 and sector a of cell 4. The BTSs associated with the sectors concurrently servicing the MS, that is, the BTSs associated with sectors 1-*b*, 3-*c*, and 4-*a*, are the Active Set of the MS. In other words, MS 1014 is in soft handoff (SHO) with the BTSs 301, 303, and 304, associated with the sectors 1-*b*, 3-*c*, and 4-*a* servicing the MS, which BTSs are the Active Set of the MS. As used herein, the terms 'Active Set' and 'serving,' such as an Active Set BTS and a serving BTS, are interchangeable and both refer to a BTS that is in an Active Set of an associated MS. Furthermore, although FIGS. 3 and 5 depict BTSs 301, 303, and 304 as servicing only a single MS, those who are of ordinary skill in the art realize that each BTS 301–307 may concurrently schedule, and service, multiple MSs, that is, each BTS 301–307 may concurrently be a member of multiple Active Sets.

In order for non-scheduling BTSs in particular to be aware of transmission opportunities provided to the mobile, one embodiment of the present invention requires that the mobile provide indication to the BTSs in the active set of the last transmission opportunity provided to it in terms of a time-stamp along with the latest buffer occupancy. However, a time stamp is expensive in terms of number of bits required. To minimize number of bits required for time stamp, the mobile could indicate a count of the number of radio frames or $n=k*radio\_frames$ since it was last scheduled.

In another embodiment of the invention every time a new BTS is added to the active set, the new BTS is provided information of the last transmission opportunity provided to the mobile. This could be either through the RNC determining this on basis of the RLC protocol layer information (in the present context the RLC protocol is still resident at the RNC) or the mobile providing this while sending measurement reports in the uplink to the RNC on potential active set members. This helps to initialize the fairness at this BTS to account for the new user it is serving.

In yet another embodiment of the invention, the mobile sends an unsolicited scheduling information (including power margin, buffer occupancy, etc.) to the active set BTSs any time it determines that the uplink signal strength at a particular BTS has exceeded some predetermined target and that therefore this BTS is likely to trigger a transmission opportunity to this mobile. This determination could be on the basis of simple downlink pilot strength and/or uplink power control command information available at the mobile. In addition, the mobile would also indicate the last transmission opportunity provided to it. The mobile could also provide information on persistence of fading information on basis of the variation of energy in the receiver fingers of the mobile, provide some speed information on basis of Doppler detection mechanism in the mobile, distance from base station, etc. However, to avoid the signaling overhead of sending such information, the information can instead be used to set the threshold level.

The frequency of reporting the above information can be increased during the period the uplink quality of this BTS (which has not scheduled this mobile for a prior predetermined time period) stays above a certain threshold. The reporting could be stopped once this BTS schedules the mobile. This can be configured by the BTS since the BTS may continue to schedule the mobile in subsequent frames if there are not too many mobiles in the cell and hence this BTS can still maintain local fairness in scheduling.

In yet another embodiment, the mobile provides the rate of increase of buffer occupancy as opposed to just the size of the buffer occupancy. This helps the scheduler in differentiating different applications (identity of which are not visible to the BTS) and provide preferential treatment for users with higher rate of increase of buffer occupancy. This also helps with flow control at the mobile, which is a substantive issue as application data rates keep rising. A variant, to keep the number of signaled bits low, could be to use one or two bits as a rate of increase indicator where potentially the network configures the values of these one or two bits, each indicating a certain rate of increase.

It is also envisioned that similar techniques could be applied for fast scheduling in the downlink, for e.g. for HSDPA. In this case, the mobile triggers a CQI (Channel quality indicator) report on the uplink any time it detects that a downlink leg exceeds some quality target and that therefore the BTS is most likely to transmit. Note that in this case this information is not used for ensuring fairness since there is a single scheduler in the downlink, i.e. only one leg has the HS-DSCH configured. However this new technique would ensure that the BTS has the latest information on the mobile's radio environment and could therefore be better able to make a good decision in terms of scheduling, modulation, etc. If and when standards are developed for enabling diversity benefits on the HS-DSCH (for HSDPA), the novel techniques of the present invention could also then assist in ensuring fairness as for the uplink enhanced channel described above.

In practice, distributed scheduling of users makes attaining fairness difficult since non-scheduling base stations may not be aware of previous transmissions and current buffer occupancy (BO). Maximizing throughput is largely dependent on scheduling which requires each user's latest channel quality (CQ) and BO but periodic reporting is RF inefficient particularly with distributed scheduling. For example, assignments to users with zero buffer can occur. Finally, time varying services requirements are not known by the scheduler(s).

Figure 6:
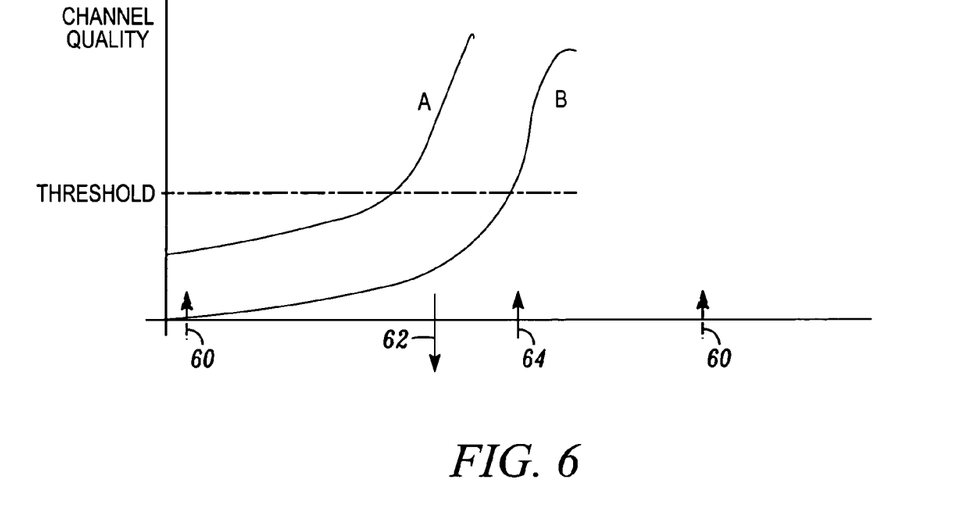
FIGS. 6 and 7 are illustrative of one aspect of the present invention.
Figure 7:
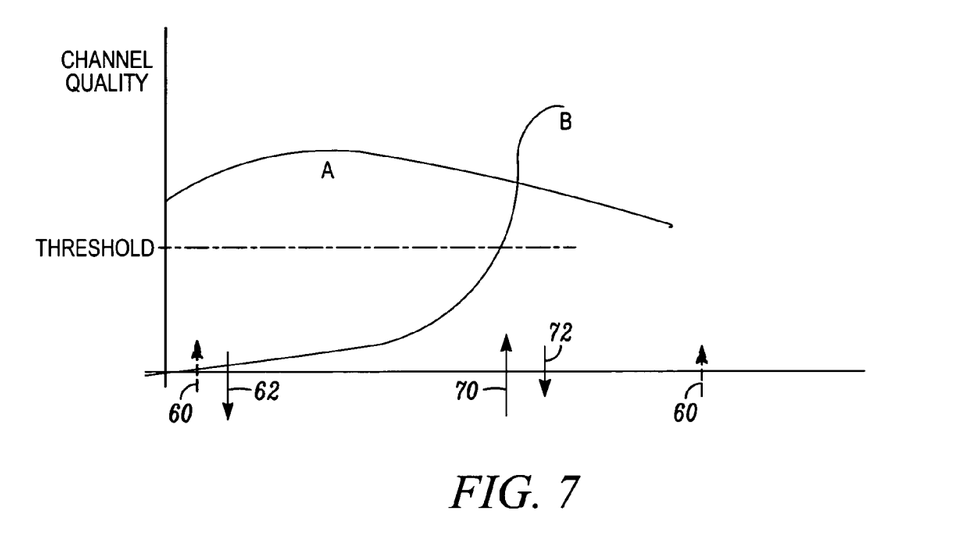

FIGS. 6 and 7 are illustrative of one aspect of the present invention. Only two BTSs (A and B) are show for simplicity. In each case, the mobile periodically transmits 60 buffer occupancy and channel quality information to the active set of BTSs. In FIG. 6 at the first periodic transmission 60, neither BTS (A or B) have particularly good signal quality, and it may be that the mobile is being scheduled by another BTS (not shown) of the active set. At a later time, the signal quality of BTS A improves to over the threshold, as previously defined. At this point, the mobile can be scheduled 62 by BTS A. At a later time, the mobile may detect that non-scheduling BTS B now also has a signal level greater than the threshold, indicating that BTS B may become a scheduler. Upon this detection, the mobile provides 64 a buffer occupancy and time stamp update to the active set of BTSs. In addition, the mobile can provide channel quality information to the BTSs. The fairness settings of the BTSs (A and B) can now be updated. In this example, BTS A still has a better signal than BTS B, so BTS A remains as the scheduler BTS and BTS B remains as a non-scheduling BTS.

In the example of FIG. 7, the mobile again periodically transmits 60 buffer occupancy and channel quality information to the active set of BTSs. At the first periodic transmission 60, BTS A has particularly good signals (i.e. above the threshold) and schedules 62 the mobile, while BTS B has a poor signal and is a non-scheduling BTS. At a later time, the signal quality of BTS B improves to over the threshold. At this point, the mobile can detect that non-scheduling BTS B now has a signal level greater than the threshold, indicating that BTS B may become a scheduler. Upon this detection, the mobile provides 70 a buffer occupancy and time stamp (e.g. 50 frames) update to the active set of BTSs. In addition, the mobile can provide channel quality information to the BTSs. The fairness settings of the BTSs (A and B) can now be updated. In this example, the rate of signal quality of scheduler A is degrading while the rate of signal quality of non-scheduler B is improving. This is taken into account in the fairness settings of the BTSs, such that BTS B can then schedule 72 the mobile while BTS A becomes a non-scheduling BTS. It is not necessary to wait for BTS B to actually improve over BTS A before switching scheduling assignments as long as the rate indications indicate that this is going to happen anyway.

Figure 8:
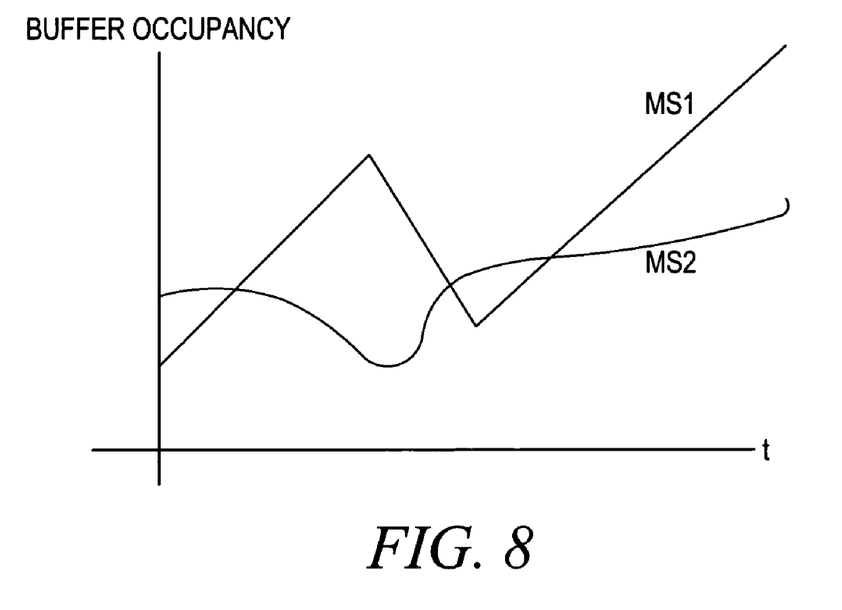
FIG. 8 is illustrative of another aspect of the present invention.

FIG. 8 is illustrative of another aspect of the present invention, wherein the rate of buffer occupancy is considered in order to provide application-driven differentiated scheduling. Individual mobiles (MS1 and MS2) are shown having different rates of buffer occupancy. The second mobile MS2 has much higher rates of change of buffer occupancy than the first mobile MS1. In this case, a BTS will want to give preference to MS2 given its higher rate of buffer occupancy increase. This improves the user experience and assists with buffer overflow (i.e. controlling data flow so as to keep buffer requirements to a minimum while ensuring maximum user experience).

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for using buffer occupancy in uplink scheduling for a communication device, the method comprising:
   sending buffer occupancy information from the communication device to a base station of an active set;
   sending a time stamp indicating a last transmission opportunity provided to the communication device from the communication device to the base station; and
   utilizing the buffer occupancy information and time stamp received from the communication device to schedule the communication device.

2. The method of claim 1, sending the time stamp includes sending a number of radio frames since the communication device was last scheduled.

3. The method of claim 1, further comprising:
   adding a base station to the active set;
   sending buffer occupancy information and a time stamp to the added base station indicating a last transmission opportunity provided to the communication device; and
   scheduling the communication device in the added base station based on the buffer occupancy information and time stamp received by the added base station.

4. The method of claim 1, further comprising:
measuring a channel quality for base stations of the active set;
determining whether the channel quality at any base station of the active set exceeds a threshold.

5. The method of claim 4, measuring the channel quality based on a measured downlink pilot channel signal strength as an indicator of channel quality.

6. The method of claim 4, measuring the channel quality based on uplink power control command information available at the communication device as an indicator of channel quality.

7. The method of claim 4, measuring the channel quality based on an uplink signal strength at a particular base station as an indicator of channel quality.

8. The method of claim 4, increasing a frequency at which buffer occupancy information and a time stamp is sent to a base station of the active set having a channel quality above the threshold during a period when the channel quality of stays above the threshold.

9. The method of claim 4, wherein the threshold is determined by at least one of a group of persistence of fading information, speed information, and distance from a particular base station.

10. The method of claim 1, wherein sending the time stamp is halted if the base station schedules the communication device.

11. The method of claim 1, sending buffer occupancy information includes sending a rate of buffer occupancy increase.

12. The method of claim 1, further comprising sending at least one of a group of persistence of fading information, speed information, and distance from a particular base station.

13. A method for using buffer occupancy in uplink scheduling for a communication device, the method comprising:
sending buffer occupancy information from the communication device to a base station of an active set;
sending a time stamp indicating a last transmission opportunity provided to the communication device to the base station of the active set;
utilizing the buffer occupancy information and time stamp to schedule the communication device;
receiving scheduling information from the base station; and
transmitting on an uplink channel in accordance with the scheduling information.

14. The method of claim 13, further comprising:
measuring a channel quality for the base stations;
determining whether a channel quality at any base station exceeds the threshold.

15. The method of claim 14, measuring channel quality includes measuring at least one of a group of downlink pilot channel signal strength, uplink power control command information available at the communication device, and uplink signal strength at a particular base station.

16. The method of claim 14, increasing a frequency of sending during a period when the channel quality of a base station of the active set stays above the threshold of the defining step.

17. The method of claim 16, halting sending of the time stamp if the base station schedules the communication device.

18. The method of claim 13, sending buffer occupancy information includes sending a rate of buffer occupancy increase.

19. A method for using buffer occupancy in uplink scheduling for a communication device, the method comprising:
measuring a channel quality for base stations of an active set;
determining whether the channel quality at any base station exceeds a signal strength threshold;
sending a rate of change in buffer occupancy from the communication device to a base station of the active set of base stations;
sending a time stamp indicating a last transmission opportunity provided to the communication device;
utilizing the rate of change in buffer occupancy and time stamp to schedule the communication device;
receiving scheduling information from the base station; and
transmitting on an uplink channel in accordance with the scheduling information.

20. The method of claim 19, increasing a frequency with which the rate of change in buffer occupancy and time stamp are sent during a period when the channel quality of a base station stays above the threshold.

* * * * *